United States Patent [19]
Condict et al.

[11] Patent Number: 5,978,115
[45] Date of Patent: Nov. 2, 1999

[54] SPAN MANAGEMENT SYSTEM FOR WAVELENGTH DIVISION MULTIPLEXED NETWORK

[75] Inventors: Keith A. Condict, Gambrills; Stephen R. Harmon, Severn; Wesley R. Jones, Gambrills; Michael B. Peters-Rodbell, Dayton, all of Md.

[73] Assignee: CIENA Corporation, Linthicum, Md.

[21] Appl. No.: 09/085,356

[22] Filed: May 27, 1998

Related U.S. Application Data

[60] Provisional application No. 60/047,537, May 27, 1997.

[51] Int. Cl.$^6$ ..................................................... H04J 14/02
[52] U.S. Cl. ..................... 359/124; 359/130; 359/134; 359/110
[58] Field of Search ................................. 359/124–125, 359/130, 110, 134, 118, 177; 370/352, 389, 907

[56] References Cited

U.S. PATENT DOCUMENTS

| | | | |
|---|---|---|---|
| 5,532,864 | 7/1996 | Alexander et al. | 359/177 |
| 5,859,716 | 1/1999 | O'Sullivan et al. | 359/110 |

FOREIGN PATENT DOCUMENTS

| | | |
|---|---|---|
| 0440276 | 8/1991 | European Pat. Off. . |
| 0568402 | 11/1993 | European Pat. Off. . |
| 0667690 | 8/1995 | European Pat. Off. . |
| 9704539 | 2/1997 | WIPO . |

*Primary Examiner*—Kinfe-Michael Negash
*Attorney, Agent, or Firm*—Daniel N. Daisak

[57] ABSTRACT

A network communication system comprising an optical communication path and a plurality of network elements disposed along the optical communication path. A first network element coupled to the optical communication path includes a first processor and a first optical component. The status of the first optical component being monitored by the first processor. The first processor generates a first electrical signal in accordance with the status of the first optical component. The first network element also includes a service channel transmitter coupled to the first processor and emits a second optical signal to the optical communication path at a second wavelength different than the first plurality of wavelengths in response to the first electrical signal. The second optical signal being modulated in accordance with the second electrical signal. A second network element is coupled to the optical communication path and includes a second processor, a second optical component coupled to the second processor and a service channel receiver coupled to the first processor and to the optical communication path. The receiver senses the second optical signal. The service channel receiver outputs a second electrical signal to the second processor in response to the second optical signal. The second processor controls the second optical component in response to the second electrical signal.

14 Claims, 5 Drawing Sheets

SPAN MANAGEMENT SYSTEM FOR WAVELENGTH DIVISION MULTIPLEXED NETWORK

This application claims the benefit of U.S. Provisional Application No. 60/047,537, filed May 27, 1997.

FIELD OF THE INVENTION

This application is related to U.S. Patent Application entitled "Distributed Intelligence Wavelength Division Multiplexed Network" to Condict et al., filed May 29, 1997, incorporated by reference herein.

The present invention is directed to an optical network management system in which each network element exchanges identification and status information for performing various monitoring and control functions in the optical network.

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and local area networks (LANs). (Optical systems are described in Gowar, Ed. *Optical Communication Systems*, (Prentice Hall, New York) c. 1993. the disclosure of which is incorporated herein by reference.)

Currently, the majority of optical communication systems are configured to carry an optical channel of a single wavelength over one or more optical waveguides. To convey information from multiple sources, time-division multiplexing (TDM) is frequently employed. In TDM, a particular time slot is assigned to each signal source with the complete signal constricted from portions of the signal collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded (e.g., by laying more fiber optic cables), the cost of such expansion is prohibitive. Consequently, there exists a need for a cost-effective way to increase the capacity of existing optical waveguides.

Wavelength division multiplexing (WDM) is being explored as an approach for increasing the capacity of existing fiber optic networks. WDM systems typically include a plurality of transmitters, each respectively transmitting signals on a designated channel or wavelength. The transmitters are typically housed in a first terminal located at one end of a fiber. The first terminal combines the channels and transmits them on the fiber to a second terminal coupled to an opposite end of the fiber. The channels are then separated and supplied to respective receivers within the second terminal.

The WDM system described in the previous paragraph can be perceived as a point-to-point connection with multiple signals carried from one terminal to the other. However, it is frequently advantageous to add and drop channels at various locations between the two terminals. Accordingly, other network elements, such as add/drop modules are often provided along the fiber in order to inject and/or remove channels from the fiber. Moreover, if the fiber extends over long distances, it is necessary to segment the fiber into sections with each fiber section being coupled to another by an additional network element that amplifies the signal (e.g., an erbium doped fiber amplifier).

To insure proper operation of the WDM system, each network element must be constantly monitored. In the event of a failure, such as a fiber break, the communication system must maintain its ability to monitor each network element. Moreover, for the communication system to automatically respond to a fault, it is necessary for each network element to identify itself and report information about its operating status.

SUMMARY OF THE INVENTION

Consistent with the present invention, a network communication system is provided, comprising an optical communication path and a plurality of network elements disposed along the optical communication path. A first network element coupled to the optical communication path includes a first processor and a first optical component. The status of the first optical component being monitored by the first processor. The first processor generates a first electrical signal in accordance with the status of the first optical component. The first network element also includes a service channel transmitter coupled to the first processor and emits a second optical signal to the optical communication path at a second wavelength different than the first plurality of wavelengths in response to the first electrical signal. The second optical signal being modulated in accordance with the second electrical signal. A second network element is coupled to the optical communication path and includes a second processor, a second optical component coupled to the second processor and a service channel receiver coupled to the first processor and to the optical communication path. The receiver senses the second optical signal. The service channel receiver outputs a second electrical signal to the second processor in response to the second optical signal. The second processor controls the second optical component in response to the second electrical signal.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

The present invention is directed toward a distributed intelligence fiber-optic communication network in which node control processors (NCPs) associated with each network element periodically transmit identification and status information to the other NCPs in the network so that corrective action can be taken automatically in response to a fault or a change in operational parameters (e.g., the number of wavelengths).

Figure 1:
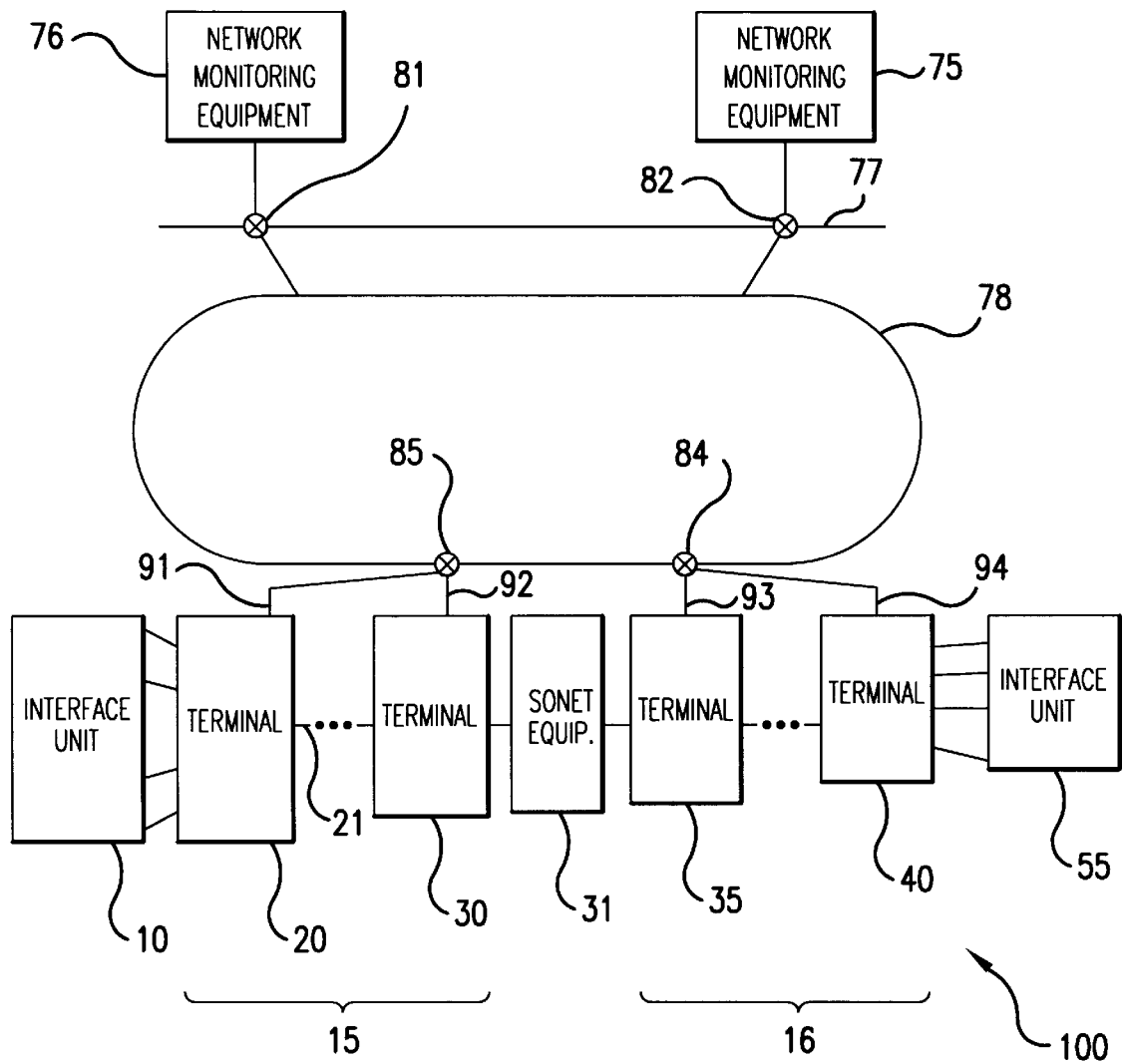
FIG. 1 is a schematic diagram of a fiber optic communication system in accordance with the present invention.

Turning to the drawings in which like reference characters indicate the same or similar elements in each of the several views, FIG. 1 illustrates a WDM communication system 100 in accordance with a feature of the present invention. As seen in FIG. 1, a plurality of optical communication signals, e.g., SONET formatted signals, are supplied by a local network (not shown) to an interface unit 10. The signals are next fed to a terminal 20. which assigns each SONET optical signal to a corresponding one of a plurality of wavelengths ($\lambda_1$ to $\lambda_n$) or channels. The wavelengths are combined using a multiplexer, as is commonly understood in the art, and supplied to fiber 21 for transmission to terminal 30. As discussed in greater detail below, channels can be added or dropped along a portion of the network between terminals 20 and 30. otherwise known as a"span" 15.

Terminal 30 transmits at least one of the channels to a second span 16 consisting of terminals 35 and 40 and network elements provided therebetween via SONET equipment 31. for example, which serves to further regenerate the optical signals. Terminal 40 includes a demultiplexer and a plurality of receivers (not shown). The demultiplexer separates the individual channels and supplies them to respective receivers. The receivers, in turn, reconstruct the SONET optical signals or signals having another protocol for transmission to interface unit 55 to a local network (not shown). Terminals 35 and 40 are also coupled to monitoring equipment 75 and 76 via Ethernet connections 93 and 94. IP router 84. internet 78. IP routers 81 and 82 and LAN 77.

Although two spans, 15 and 16. are shown in FIG. 1, communication system 100 can include any number of spans. Typically, however, the end terminals of a span are spaced by a distance of approximately 500 km. Accordingly, for transmission between WDM equipment more than 500 km apart, more than one span is typically used.

In addition to the information bearing channels described above, a service channel at a wavelength different than the information bearing channels and carrying diagnostic and span topology information can also be transmitted through each span. Information associated with span 15 is coupled via Ethernet connections 91 and 92. respectively to internet protocol (IP) router 85. This IP router passes the information (described in greater detail below) via internet 78 to additional IP routers 81 and 82. Local area network (LAN) 77 transmits the information from IP routers 81 and 82 to network monitoring equipment 75 and 76. respectively. Finally, information associated with span 16 is similarly passed to network monitoring equipment through Ethernet links 93 and 94 and IP router 84.

Figure 2:
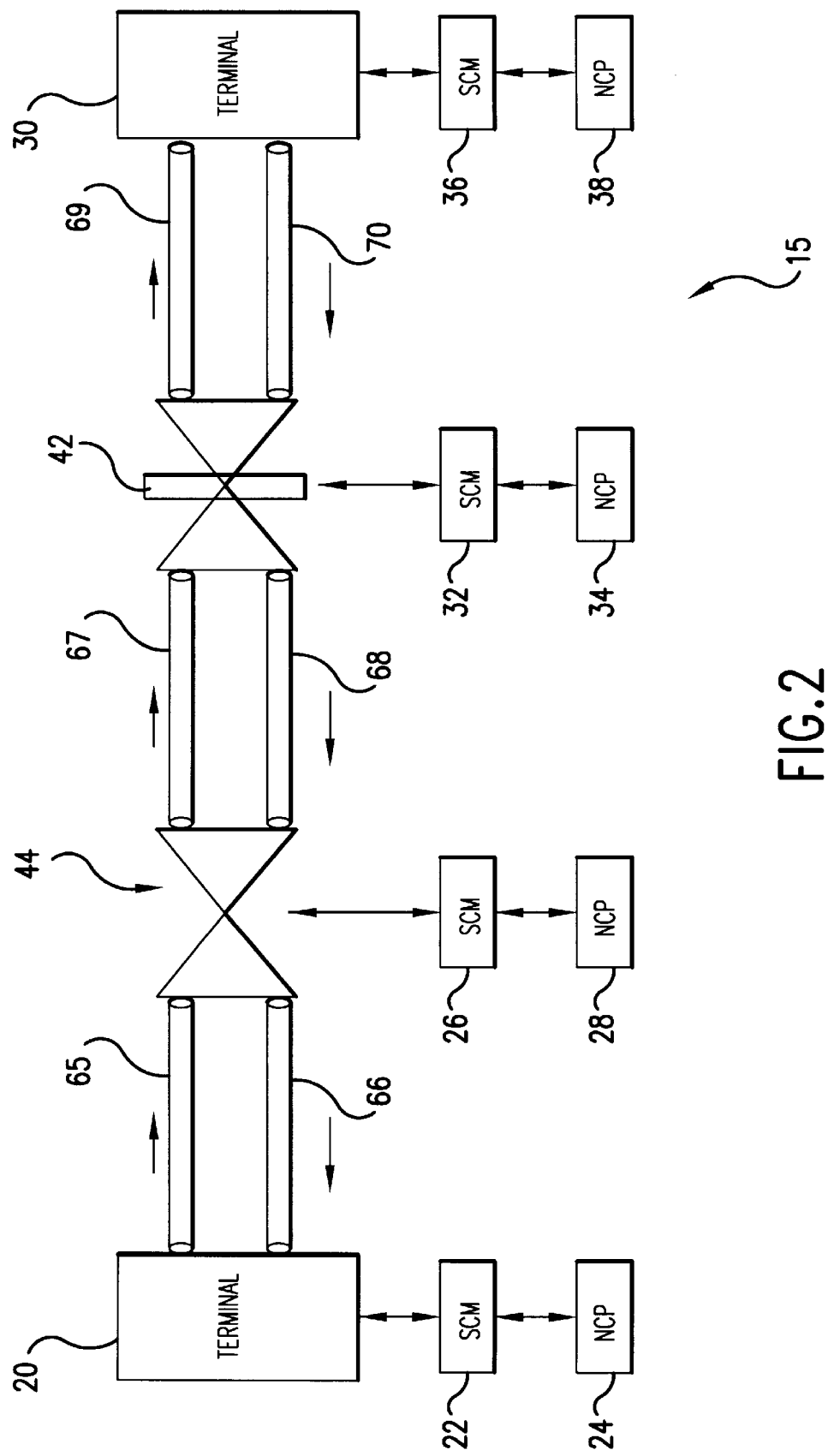
FIG. 2 is a schematic diagram of a fiber optic span in accordance with the present invention.

FIG. 2 illustrates an exemplary span 15 in greater detail. As discussed above, span 15 includes end terminal 20. as well as a plurality of other network elements, as required. These network elements can include regenerative devices, such as an erbium doped fiber amplifier 44. and optical add/drop module 42. As noted above, amplifier 44 amplifies signals input thereto, while add/drop module 42 extracts/ inserts one or more channels from the optical communication path.

As further shown in FIG. 2, fibers 65, 67 and 69 carry data communication channels in an "east" direction, while fibers 66, 68 and 70 carry data communication channels in a "west" direction. Typically, these fibers also carry the service channel at a wavelength that is different than those associated with the data communication channels.

Figure 3:
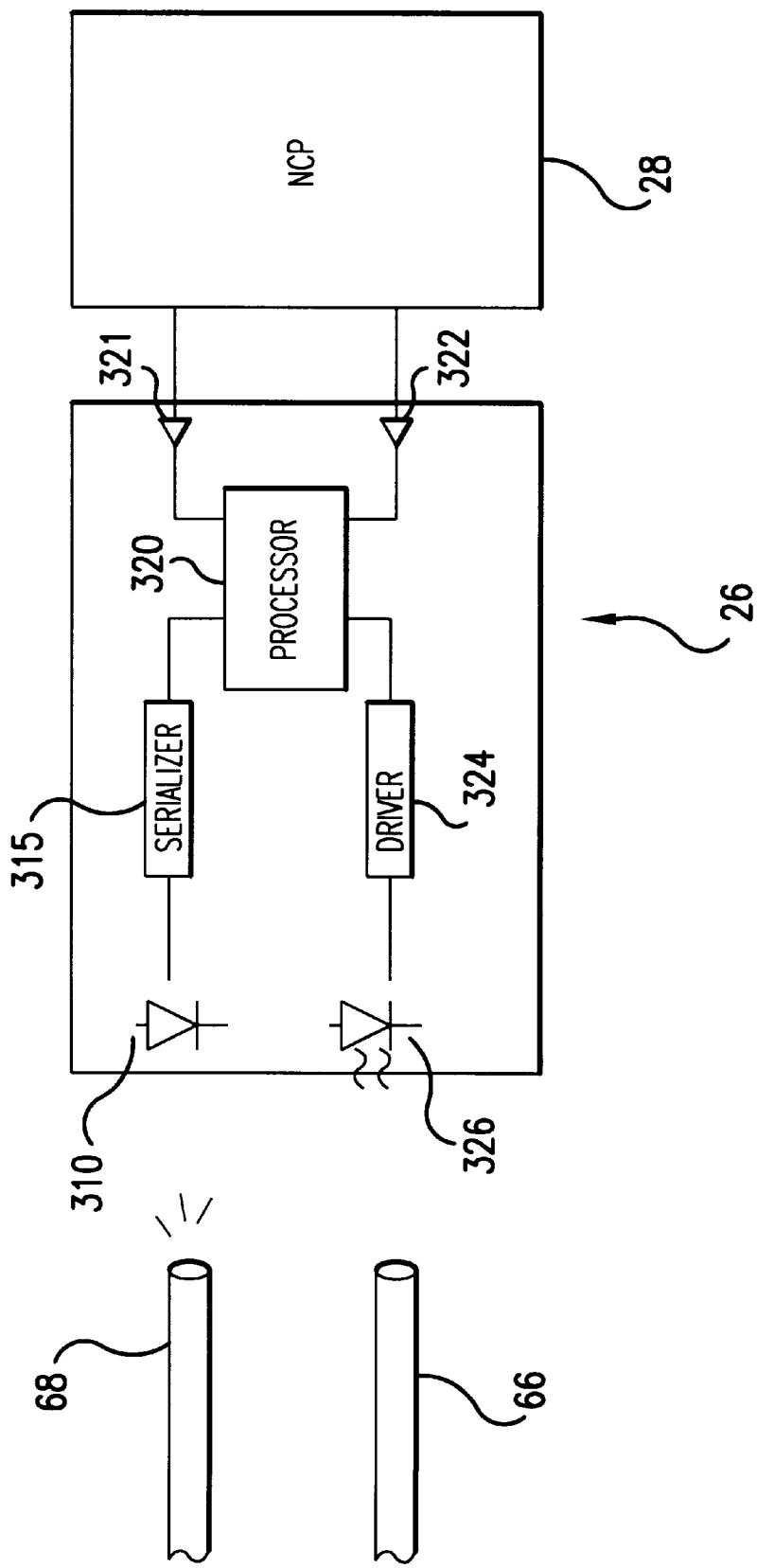
FIG. 3 is a schematic diagram of a service channel modem in accordance with the present invention.

Each network element has an NCP and transmission module or service channel modem (SCM), through which the NCP transmits and receives information. As shown in FIG. 3, a service channel modem 26 is shown in greater detail. As seen in FIG. 3, service channel modem 26 includes a photodetector 310 sensing incoming light at the service channel wavelength on fiber 68. Photodetector 310 outputs electrical signals in response to the incoming light to serializer 315, which waveshapes the electrical signals and supplies them to processor 320. In response to these electrical signals, processor 320 supplies an output through buffer 322 to node control processor 28 and or to laser driver circuit 324. which drives laser 326 to output corresponding optical signals on fiber 66. Processor 320 also receives status and identification information, as described above, and passes this information to laser driver 324 so that laser 326 outputs corresponding optical signals to fiber 66.

Generally, the NCP monitors, stores and transmits status and identification of its network element via the SCM to other network elements in the span. Each NCP includes a commercially available general purpose programmable microprocessor, for example, a Motorola M68040, which handles information processing within each NCP. Memory storage, such as a flash memory, is also utilized to store information associated with each network element. An NCP may also contain an additional microprocessor, such as a Motorola M68360, used to manage input/output communications between network elements. The NCP receives status and identification information associated with other network elements in the span through the SCM. Identification information can include, for example, the network address, and the physical location of the network element. Status information provided for each communication channel indicates whether the network element is operational, degraded (i.e., utilizing a spare or redundant device) or failed.

For each communication channel, a network element can include one or more "sources," "sinks," and "blocks." A source is a point of channel origination, such as a laser, and is usually provided in a terminal. A sink is a point of channel termination where the channel is detected and associated information is passed beyond the span. Sinks are also provided in a terminal. A block, on the other hand, is a point of termination of at least one channel, usually without any further detection. Optical add/drop modules typically include sources, sinks and blocks.

Figure 4:
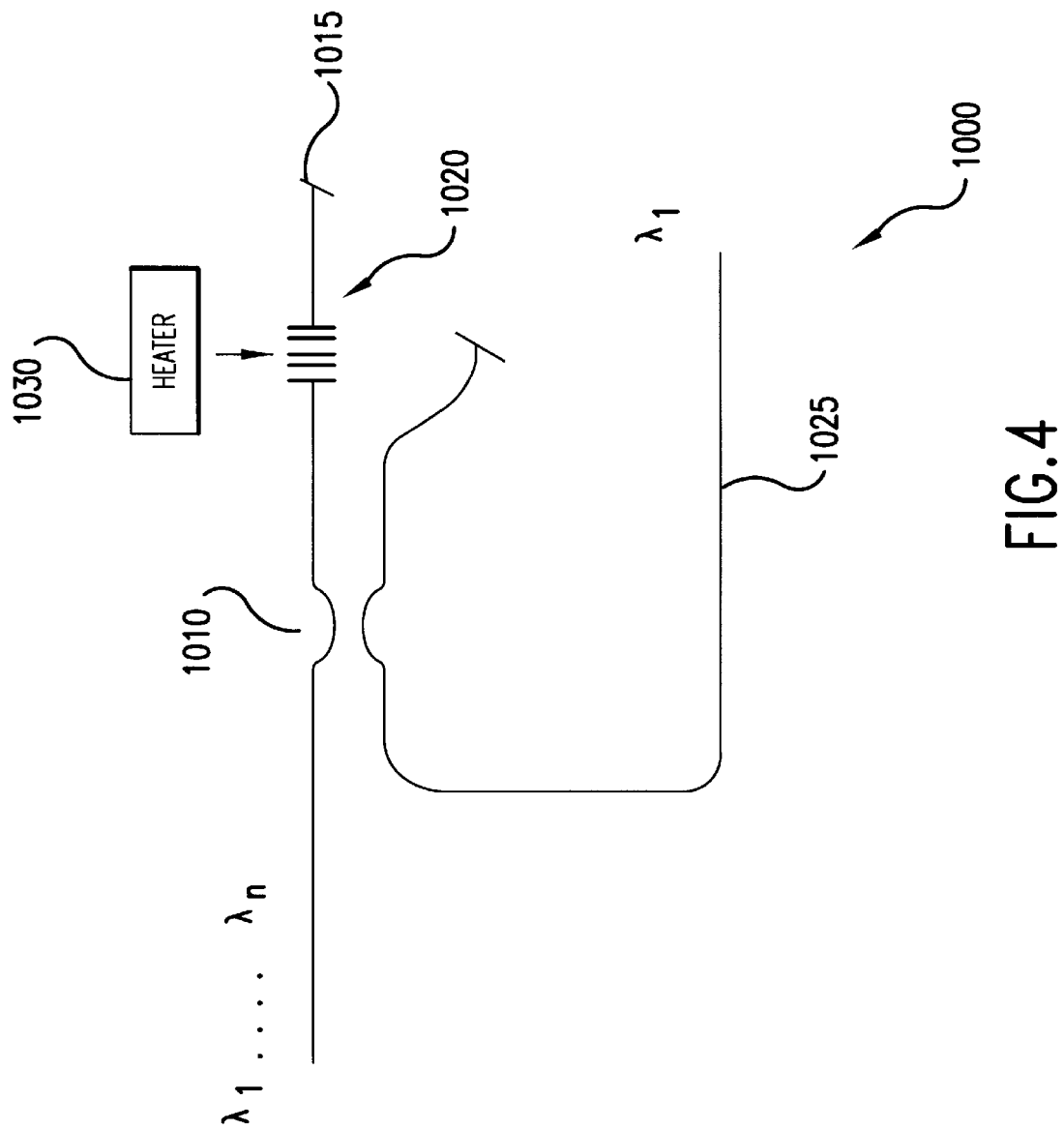
FIG. 4 is a schematic illustration of a selector in accordance with the present invention.

Sinks generally include a selector 1000. shown for example in FIG. 4. Selector 1000 includes a directional coupler which passes wavelengths $\lambda_1$ to $\lambda_n$ to in-fiber Bragg grating 1020, as described, for example in Morey et al., Photoinduced Bragg Gratings in Optical Fibers, Optics & Photonics News, February 1994, pp. 9–14, and A. M. Vengsarkar et al., Long-Period Fiber Gratings As Band-Rejection Filters, Journal of Lightwave Technology, vol. 14, no. 1, January 1996, pp. 58–65, the disclosures of which are incorporated herein by reference. In-fiber Bragg grating 1020 selectively reflects optical signals at a particular wavelength (e.g., $\lambda_1$), while transmitting those at other wavelengths. In-fiber Bragg grating 1020 generally constitutes a periodic variation in refractive index over a section of fiber. The periodic variation in refractive index can take the form of a series of "peaks" and "valleys," whereby the distance or period between two adjacent refractive index peaks defines, in part, the wavelength to be reflected by Bragg grating 1020.

In the exemplary selector shown in FIG. 4, the period of grating 1020 is designed to reflect light at wavelength $\lambda_1$ and pass the remaining wavelengths to low reflectivity port 1015. The reflected $\lambda_1$ light is passed back to coupler 1010 where it is diverted to output fiber 1025.

Figure 5:
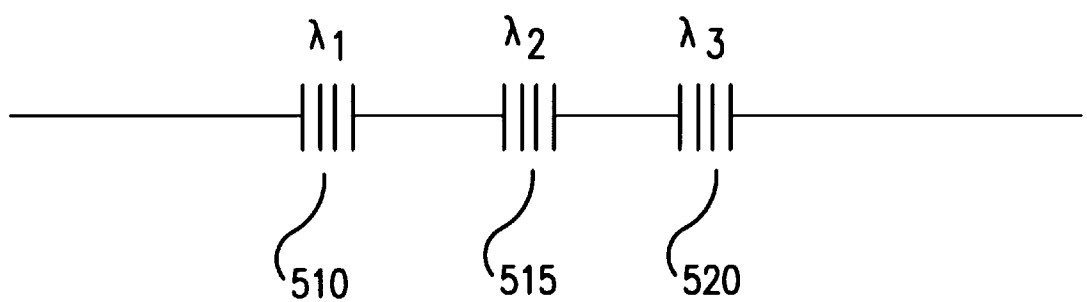
FIG. 5 is a schematic illustration of several grating in series in accordance with the present invention.

In a "block", several gratings can be provided in series along a fiber to filter a group of wavelengths. For example, as shown in FIG. 5, gratings 510, 515 and 520 are fabricated with spacings to respectively reflect wavelengths $\lambda_1$, $\lambda_2$, and $\lambda_3$. Heaters are not shown in FIG. 5.

The temperature of an in-fiber Bragg grating affects the period of the grating, and thus the wavelength of the reflected light. Accordingly, heater 1030. for example, maintains in-fiber Bragg grating 1020 at a constant temperature, which is monitored by an NCP. If the temperature drifts outside a predetermined range, a heater alarm signal is broadcast to the other NCPs in the span through its respective SCM. In response to the alarm signal, terminal and add/drop module NCPs upstream from the defective heater deactivate the source lasers that emit light at wavelengths falling within the passband of the failed selector in-fiber grating. For example, if heater 1030 fails in such a way as to cause excessive heating of in-fiber grating 1020. source lasers emitting light 100 GHz lower in frequency than the channel to be selected by the selector containing the failed heater are disabled. On the other hand, if in-fiber grating 1020 cools, source lasers emitting light 100 GHz higher in frequency are disabled. Accordingly, channels near the wavelength to be selected are disabled, thereby insuring that these channels are not extracted by the faulty selector.

An NCP controlling a source laser can be programmed to either reactivate the source laser upon receiving a signal that the grating heater is operational or require manual activation.

Returning to FIG. 2, amplifier 44 typically includes an erbium doped fiber amplifier pumped with light at 1480 nm, for example. The amount of optical energy required to pump amplifier 44 is based, in part, upon the number of channels passing through the amplifier. Amplification of relatively few channels requires less power than amplification of a relatively large number of channels. If excessive pump power is supplied to the amplifier, however, the resulting high output light intensity can cause optical noise in the fiber. In particular, backscattered light caused by acousto-optic interactions, known as Brillouin scattering, is generated.

Accordingly, NCP 28 associated with amplifier 44. for example, determines the number of amplified channels based upon identification and status information broadcast by NCPs along the span. Thus, assuming that channels 1–16 are launched on fiber segment 70 in FIG. 2, and add/drop module 42 extracts channels 1–8, NCP 38 will broadcast that each of the 16 sources in terminal 30 are transmitting light, while NCP 34 will broadcast that channels 1–8 have been blocked. NCP 28 receives this information, calculates that eight channels are being supplied to amplifier 44. A table lookup is performed to determine the optimum pump power supplied to amplifier 44 based on the number of supplied channels. A proportional gain algorithm is used, for example, to adjust the pump power being supplied to amplifier 44. Table 1 below lists exemplary numbers of channels and corresponding pump powers at 1480 nm.

TABLE 1

| No. of Channels | 1480 nm Pump Power |
|---|---|
| 1–4 | 50 mW |
| 5–8 | 66 mW |
| 9–12 | 85 mW |
| 13–16 | 110 mW |

In the above example, therefore, upon a determination that 8 channels have been received by amplifier 44, NCP 28 will adjust the 1480 nm pump power to 66 mW.

As noted above, a plurality of channels are transmitted through the span of a WDM system. It is therefore also necessary to monitor the span to insure that the same channel is not transmitted by two sources along the same segment of the span. Thus, for example, prior to enabling a source laser at a particular wavelength in terminal 20, NCP 24 will determine, based on received information from other NCPs in the span, whether any other sources are transmitting at that wavelength. If so, NCP 24 can be programmed to activate the source laser only when the other source or sources ceases operation. Alternatively, NCP 24 can be programmed to enable the source laser after a predetermined period of time or require manual activation.

The NCPs along a span can further be programmed to identify the precise location of a fault, otherwise known as fault correlation. For example, if amplifier 44 in FIG. 2 is defective, NCPs 34 and 38 down the span may detect an absence of an amplified signal and broadcast that a fault has occurred upstream (assuming transmission on fibers 65, 67 and 69). Accordingly, from the perspective of the NCPs in the span, either amplifier 44. terminal 20 or both of these network elements are defective. However, if NCP 24 broadcasts that terminal 20 is operational, each NCP can determine that only amplifier 44 is faulty. Where a fault, such as a fiber break, occurs each receiver within the span of the fiber break goes "dark." Consequently, alarms are initiated for each receiver affected by the fiber break. This may include several receivers at the same location depending on the network configuration. In this instance, all or a selected number of receiver alarms may be suppressed which are symptomatic of the fiber break.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical communication apparatus, comprising:

an optical communication path carrying a plurality of first optical signals, each at a respective one of a plurality of first wavelengths;

a first network element coupled to said optical communication path, said first network element including:

a first processor;

a first optical component, a status of said first optical component being monitored by said first processor, said first processor generating a first electrical signal in accordance with said status of said first optical component; and a service channel transmitter coupled to said first processor, said service channel transmitter emitting a second optical signal to said optical communication path at a second wavelength different than said first plurality of wavelengths in response to said first electrical signal, said second optical signal being modulated in accordance with said second electrical signal; and a second network element coupled to said optical communication path, said second network element including:

a second processor;

a second optical component coupled to said second processor; and a service channel receiver coupled to said second processor and to said optical communication path and sensing said second optical signal, said service channel receiver outputting a second electrical signal to said second processor in response to said second optical signal, said second processor controlling said second optical component in response to said second electrical signal.

2. An optical communication apparatus in accordance with claim 1, wherein said first optical component comprises a laser, and said second optical component comprises an optical amplifier.

3. An optical communication apparatus in accordance with claim 2, wherein said optical amplifier comprises an erbium doped fiber amplifier, and said second processor controls a pump power supplied to said erbium doped fiber amplifier in response to said second electrical signal.

4. An optical communication apparatus in accordance with claim 1, wherein said first optical component comprises an in-fiber Bragg grating and said second optical component comprises a laser, and said first processor monitoring a temperature of said in-fiber Bragg grating.

5. An optical communication apparatus, comprising:
   a first wavelength division multiplexed terminal coupled to a first end portion of an optical communication path, said first wavelength division multiplexed terminal being configured to supply a plurality of optical signals to an optical communication path, each of said plurality of optical signals being at a respective one of a plurality of wavelengths;
   a second wavelength division multiplexed terminal coupled to a second end portion of said optical communication path, said second wavelength division multiplexed terminal receiving said plurality of optical signals; and
   an interconnecting unit coupled to said second wavelength division multiplexed terminal, said interconnecting unit being configured to receive service channel data from said second wavelength division multiplexed terminal and supply said service channel data to a network.

6. An optical communication apparatus in accordance with claim 5, further comprising:
   a first internet protocol router coupled to said interconnecting unit and said network, said first internet protocol router supplying said service channel data to said network; and
   a second internet protocol router coupled to said network, said second internet protocol router receiving said service channel data via said network, and supplying said service channel data to a processor.

7. An optical communication apparatus in accordance with claim 5, wherein said interconnecting unit comprises an Ethernet connection.

8. An optical communication apparatus in accordance with claim 5, further comprising an additional interconnecting unit, said additional interconnecting unit coupling said first wavelength division multiplexed terminal to said network.

9. An optical communication apparatus in accordance with claim 8, further comprising an internet protocol router coupled to said first and second interconnecting units and said network.

10. An optical communication apparatus in accordance with claim 8. wherein said interconnecting unit comprises a first Ethernet connection and said second interconnecting unit comprises a second Ethernet connection.

11. A method of supervising an optical transmission system, comprising the steps of:
   monitoring a first optical component provided at a first location along an optical communication path, said optical communication path carrying a plurality of first optical signals, each of which being at a respective one of a plurality of first wavelengths;
   modulating a second optical signal in accordance with information associated with said first optical component, said second optical signal being at a wavelength different than said plurality of first wavelengths;
   supplying said second optical signal to said optical communication path;
   detecting said second optical signal; and
   controlling a second optical component provided at a second location spaced from said first location along said optical communication path based on said information.

12. A method in accordance with claim 11, wherein said first optical component comprises an in-fiber Bragg grating and said second optical component comprises a laser, said monitoring step further comprising the step of monitoring a temperature of said in-fiber Bragg grating.

13. A method in accordance with claim claim 11, wherein said fist optical component comprises a laser and said second optical component comprises an optical amplifier.

14. A method in accordance with claim 13, wherein an optical pump power supplied to said optical amplifier is controlled in accordance with said second optical signal.

* * * * *